United States Patent [19]

Billings

[11] Patent Number: 5,684,956
[45] Date of Patent: Nov. 4, 1997

[54] DATA TRANSMISSION SYSTEM WITH PARALLEL PACKET DELIVERY

[76] Inventor: Roger E. Billings, 26900 E. Pink Hill Rd., Independence, Mo. 64057-3294

[21] Appl. No.: 338,682

[22] Filed: Nov. 14, 1994

[51] Int. Cl.$^6$ .................................................. G06F 13/00
[52] U.S. Cl. ........................... 395/200.03; 395/200.33; 395/800; 395/200.69
[58] Field of Search ............... 395/200.03, 200.15, 395/200.16, 200.13, 300, 308, 858, 800, 200.09, 100, 200.08, 200.69, 182.13, 182.16; 358/335; 348/7, 10; 340/85.8; 370/60, 85.1, 390, 218

[56] References Cited

U.S. PATENT DOCUMENTS

| | | | |
|---|---|---|---|
| 3,245,045 | 4/1966 | Randlev | 395/200 |
| 3,798,605 | 3/1974 | Feistel | 380/25 |
| 4,454,593 | 6/1984 | Fleming et al. | 395/200 |
| 4,780,821 | 10/1988 | Crossley | 395/650 |
| 5,091,849 | 2/1992 | Davis et al. | 395/100 |
| 5,163,147 | 11/1992 | Orita | 395/600 |
| 5,224,166 | 6/1993 | Hartman, Jr. | 380/50 |
| 5,253,248 | 10/1993 | Dravida et al. | 370/16 |
| 5,262,875 | 11/1993 | Mincer et al. | 358/335 |
| 5,355,452 | 10/1994 | Lam et al. | 395/200 |
| 5,414,837 | 5/1995 | Kotatsu | 395/600 |
| 5,440,334 | 8/1995 | Walters et al. | 348/6 |
| 5,442,389 | 8/1995 | Blahut et al. | 348/7 |
| 5,442,749 | 8/1995 | Northcutt et al. | 395/200.09 |
| 5,442,750 | 8/1995 | Harriman, Jr. et al. | 395/200 |
| 5,488,412 | 1/1996 | Majeti et al. | 348/10 |
| 5,497,369 | 3/1996 | Wainwright | 370/60 |
| 5,506,962 | 4/1996 | Orimo et al. | 395/200.03 |
| 5,517,600 | 5/1996 | Shimokawa | 395/27 |

*Primary Examiner*—Meng-Ai T. An
*Attorney, Agent, or Firm*—Hovey, Williams, Timmons & Collins

[57] ABSTRACT

A distributed data processing system including a data server computer coupled to a plurality of personal computers by a local area network communication path and a second data communication path independent of the local area network communication path is provided. Information stored in the data server computer is periodically transmitted over the second data communication path simultaneously to all of the personal computers in the network. The personal computers do not necessarily initiate data requests over the local area network communication path. Rather, certain preselected information is continually transmitted to all of the personal computers in broadcast fashion.

27 Claims, 3 Drawing Sheets

DATA TRANSMISSION SYSTEM WITH PARALLEL PACKET DELIVERY

BACKGROUND OF THE INVENTION

1. Field of the Invention

The present invention is related to data transmission systems, and more particularly to a distributed data processing system including a data server computer coupled with a plurality of personal computers. The computers are coupled by a first communication path to create a conventional local area network distributed data processing system. The computers are also coupled by a second data communication path independent of the local area communication path for periodically transmitting information to the personal computers in broadcast fashion.

2. Description of the Prior Art

In the past, mainframe computers met the computing needs of most businesses and offices. Mainframe computers generally include a large central processor coupled with a plurality of input/output terminals. The terminals allow users to make data requests, and the central processor stores all the information and processes the data requests and calculations.

Microcomputers or personal computers were later developed. Microcomputers are generally stand alone units which include their own processor, memory storage, display screen, keyboard, application programs, and peripherals such as printers. Due to the complexity and cost of mainframe computers and minicomputers, personal computers have replaced mainframe computers for many computing applications. Due to their relatively low cost, many companies and offices use multiple personal computers for data processing. Executable files are stored directly in the memory of each of the personal computers, and each personal computer operates independently from the other personal computers.

Although stand alone personal computers provide inexpensive computing power for a plurality of users, they suffer from several limitations. For example, most users of personal computers within a company or office use the same computer programs such as WordPerfect and Lotus 123. Accordingly, these computer programs must be loaded individually on each and every personal computer located in the office. Moreover, when the computer programs are revised, or when new peripherals are offered, the programs loaded on each personal computer must be updated. In large offices, the labor requirements for this continual updating is great.

Another disadvantage of stand alone personal computers is that they do not permit users of a plurality of computers to share information and resources. For example, if personal computers are not networked, each computer must have its own application software and peripherals.

To alleviate the problems associated with multiple stand alone personal computers, distributed data processing systems have been developed. For example, a functionally structured distributed data processing system utilizing file server technology is disclosed in U.S. Pat. No. 4,714,989, whereby incorporated by reference.

Distributed data processing systems generally include a data server computer coupled with a plurality of personal computers by a local area network communication path. The data server computer stores information used by all of the personal computers such as data and application software. The personal computers receive information from the data server computer by transmitting a data request over the local area network. The data server computer receives the data request and transmits the information to the personal computer over the same local area network communication path.

Distributed data processing systems solve many of the problems associated with stand alone personal computer systems. For example, with distributed data processing systems, network versions of programs can be loaded on the data server computer for execution on each individual personal computer. Moreover, frequent revisions of computer programs can be easily loaded on the data server computer. Accordingly, the labor requirements for loading and updating computer programs are significantly reduced. Additionally, distributed data processing systems allow multiple personal computers to share information and peripherals such as printers and plotters.

Although distributed data processing systems offer advantages over mainframe computers, minicomputers and stand alone personal computer systems, they also suffer from several limitations. For example, as more personal computers are added to a local area network, the network and the data server computer become overloaded and have difficulty meeting the increased demand for information. This results in slower throughput of information and lost productivity as users of the personal computer wait idly for information. Compounding the problem, the information loaded on the data server computers is becoming more complex and voluminous. In particular, programs utilizing high resolution graphics, compressed digital video and digital sound are becoming more popular. Transmission of these programs congest the local area networks and slow response times.

Another limitation of prior art distributed data processing systems is that data requests from the personal computers and information transmissions from the data server computer are sent over the same local area network communication path. Often, two or more personal computers issue simultaneous data requests which compete for the local area network communication path. As those skilled in the art will appreciate, these request competitions significantly reduce the throughput of the distributed data processing system.

To overcome the problems associated with overloaded local area networks, several solutions have been offered. For example, larger and faster data servers and local area networks with larger bandwidth capabilities have been developed. Additionally, local area networks encompassing a large number of personal computers have been divided into multiple smaller local area networks connected by routers or bridges. While these approaches have greatly improved system performance, they are costly and create delays when it is necessary for users to share information over multiple local area networks simultaneously. Moreover, these solutions only increase throughput marginally, and the gains are quickly lost when additional personal computers are added to the networks.

Accordingly, there is a need for an improved distributed data processing system which overcomes the limitations of the prior art. More particularly, there is a need for an improved distributed data processing system which can handle today's increased information requirements without the installation of additional and costly hardware.

SUMMARY OF THE INVENTION

The present invention overcomes the problems outlined above and provides an improvement in the state of the art of distributed data processing systems. More particularly, the present invention provides a distributed data processing system which networks a data server computer to a plurality of personal computers over a conventional local area network communication path and provides a second data communication path which removes much of the information transmission from the network communication path. The distributed data processing system broadly includes a data server computer, a plurality of personal computers, a conventional local area network communication path for networking the data server computer to the personal computers, and structure for coupling the personal computers to the data server computer independent of the network communication path for periodically transmitting preselected information from the data server computer to the personal computers.

In more detail, the data server computer is operable for storing information used by all of the personal computers and includes conventional hardware and software for storing and transmitting information such as computer programs. The personal computers are networked to the data server computer by a conventional local area network communication path and each includes conventional hardware and software for receiving and storing the information transmitted from the data server computer. The coupling structure provides a second single direction information communication path between the data server computer and the personal computers which is independent of the conventional local area network communication path. The coupling structure of the present invention operates in part on the principle that most computer programs and other information transmitted over local area networks are frequently read by the personal computers but rarely modified and re-routed back to the data server computer. Since the computer programs are frequently read, the local area networks are continually congested with data requests from the personal computers. The present invention reduces the congestion on the local area networks by removing information which is only read by the personal computers from the conventional local area network communication path and placing it on a second information communication path.

The coupling structure of the present invention includes a server adaptor board which couples with the data server computer and a PC adaptor board which plugs into an expansion slot of each of the personal computers. The adapter boards are coupled together by conventional cabling to link the personal computers to the data server computer. In preferred forms, the adaptor boards are coupled together by the two spare pairs of twisted copper cables in existing category five wiring installations. The coupling structure may be installed on local area networks utilizing conventional adaptors such as Ethernet or Token Ring. When coupled to an existing Ethernet or Token Ring local area network, the coupling structure provides a second information communication path which is independent of the local area network communication path.

The preferred coupling structure periodically transmits preselected information stored in the data server computer. The preselected information can be computer programs and other information which are frequently read by the personal computers. The coupling structure periodically transmits this preselected information simultaneously to all of the personal computers in the network which relieves a substantial part of the burden on the first link. Unlike prior art distributed data processing systems, the present invention does not require the personal computers to initiate data requests over the local area network communication path. Rather, certain preselected information is continually or periodically transmitted to all of the personal computers. The coupling structure communication path is dedicated for the single direction transmission of information from the data server computer to the personal computers. Accordingly, the coupling structure communication path is never congested with data requests from the personal computers. Moreover, the transmitted information can be simultaneously loaded into all of the personal computers.

Although the information periodically transmitted over the second communication path is normally preselected based on frequent data requests, it can be dynamically managed so that additional information can be requested by users operating the personal computers. A user desiring additional information not normally transmitted from the data server computer can initiate a data request over the conventional Ethernet or Token Ring local area network path. The requested information is transmitted along with the preselected information. Since many files stored at a data server computer are secured files, the coupling structure of the present invention first verifies the security privilege of the person requesting the file.

To increase the throughput of information over the single direction communication path, the coupling structure may interleave multiple files of data into a multi-channel transmission signal. This allows the information to be transmitted at a speed considerably faster than the rate at which the individual personal computers can retrieve the information from the communication path. For example, a 16 channel transmission signal may be used to transmit information from the buffer at a transmission rate which is 16 times faster than the retrieval rate of the personal computers. This allows sixteen separate files to be interleaved into the 16 channel transmission signal. The personal computers monitor the transmission signal and retrieve only the desired information from one of the 16 channels as it passes by.

With the above described invention, numerous advantages are obtained. For example, since the second communication path is dedicated for the single direction transmission of information from the data server computer, frequently read information can be removed from the conventional local area network communication path. Accordingly, the conventional network communication path does not become congested with data requests from the personal computers, and it is possible to add more personal computers to the network without overloading the data server computer. This also eliminates the need for larger data server computers, bridges and routers. Since the personal computers can monitor the transmission signals, messages such as "new E-mail pending" can be delivered without loading the conventional network with frequent requests about the arrival of new mail and the corresponding responses.

Additionally, since all of the personal computers on the local area network can simultaneously read a single transmission of a computer program or other information transmitted over the coupling structure communication path, it is possible to add many more personal computers to the network. Moreover, unlike prior art distributed data processing systems, it is possible to add additional personal computers to the network without slowing down the rate at which computer programs and other information can be loaded into the individual personal computers.

Since it is possible to construct larger networks with a single data server computer, it is possible to more precisely and carefully manage the security of a network by keeping information which is normally stored on multiple data server computers on one data server computer. Further, in applications with personal computers that only read information, it is possible to create a distributed data processing system without conventional local area networks such as Ethernet or Token Ring. For example, the present invention could be implemented in an environment where a large number of personal computers are provided periodic transmissions of technical information which is of interest to all or many of the users.

BRIEF DESCRIPTION OF THE DRAWINGS

A preferred embodiment of the present invention is described in detail below with reference to the attached drawing figures, wherein:

FIG. 4 is a block diagram of the components of a personal computer adaptor board which couples with each of the personal computers.

DETAILED DESCRIPTION OF THE PREFERRED EMBODIMENTS

Figure 1:
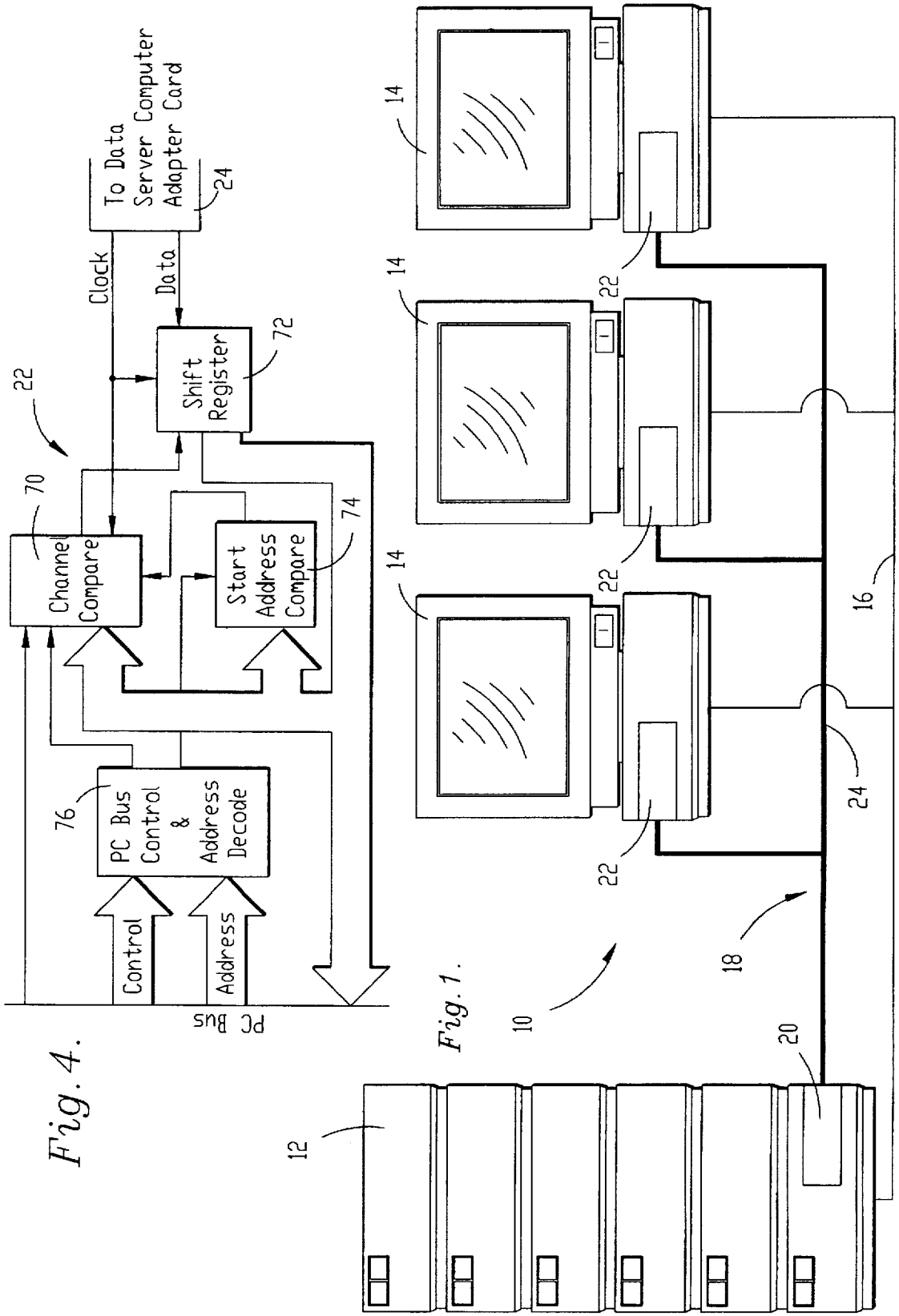
FIG. 1 is a schematic view illustrating a distributed data processing system constructed in accordance with a preferred embodiment.

Turning now to the drawings, and particularly FIG. 1, a distributed data processing system 10 constructed in accordance with a preferred embodiment of the present invention is illustrated. The distributed data processing system broadly includes data server computer 12, a plurality of personal computers 14, a conventional local area network path 16 for networking personal computers 14 to data server computer 12, and coupling structure 18 for coupling personal computers 14 to data server computer 12 independent of the local area network communication path 16 for periodically transmitting preselected information from the data server computer 12 to the personal computer 14.

Data server computer 12 may be a conventional computer such as an IBM compatible microcomputer. The operations of data server computer 12 are supervised by Netware or other similar operating softwares. Data server computer 12 includes input/output ports, a microprocessor, and digital memory storage for receiving, storing, and transmitting information such as computer programs or other information. The preferred data server computer 12 includes a plurality of expansion slots for receiving circuit board interface cards for converting the computer into a data server computer. These circuit board interface cards communicate with the network operating system software loaded on the data server computer by means of interface control software.

Personal computers 14 may be conventional microcomputers such as IBM compatible computers having Intel 486 processors. Each personal computer 14 includes a processor, memory storage, display screen, keyboard, and various peripherals such as printers. Personal computers of various makes and models may be interconnected with the present invention. Each personal computer 14 includes a plurality of expansion slots for receiving circuit board interface cards for converting the personal computer into a networked personal computer. As described in more detail below, these circuit board interface cards communicate with the operating system software loaded on the personal computers.

Personal computers 14 are coupled with data server computer 12 by a pair of communication paths. As described in more detail below, the first communication path 16 is a conventional local area network communication path and the second communication path 18 is single direction information communication path between data server computer 12 and personal computers 14. Path 18 is independent of the local area network communication path 16.

First communication path 16 couples data server computer 12 with personal computers 14 to form a networked distributed data processing system. Data server computer 12 and personal computers 14 each include a plurality of expansion slots for receiving circuit board interface cards. For example, data server computer 12 and personal computers 14 may be equipped with circuit board interface cards and networking software which couple the computers to form a conventional local area network communication path such as Ethernet or Token Ring using conventional category #5 twisted wires. The circuit board interface cards communicate with the operating system software loaded on the computers.

Coupling structure 18 provides a second communication path which is independent from the above described local area network communication path 16. The preferred coupling structure 18 includes server adaptor card 20 which couples with an expansion slot in data server computer 12, a plurality of personal computer adaptor cards 22 which couple with expansion slots in each personal computer 14, and second communication path 24 coupling server adaptor card 20 to each personal computer adaptor cards 22. Although a specific and preferred embodiment of the components of coupling structure 18 is described and illustrated herein, it is to be understood that the disclosed embodiment is merely exemplary of the invention, which may be embodied in various forms.

Figure 2:
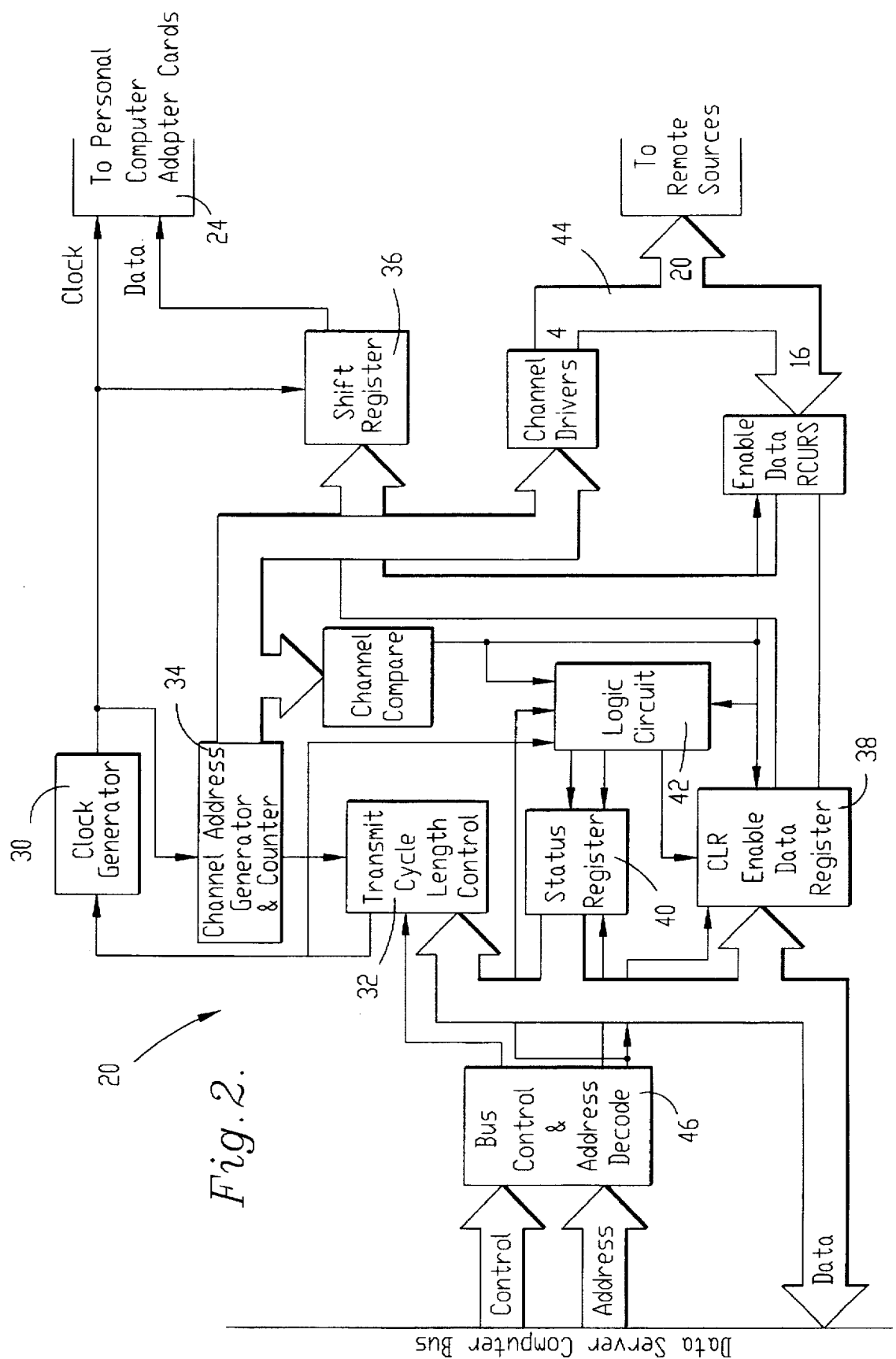
FIG. 2 is a block diagram of the components of a server adaptor board which couples with the data server computer.
Figure 3:
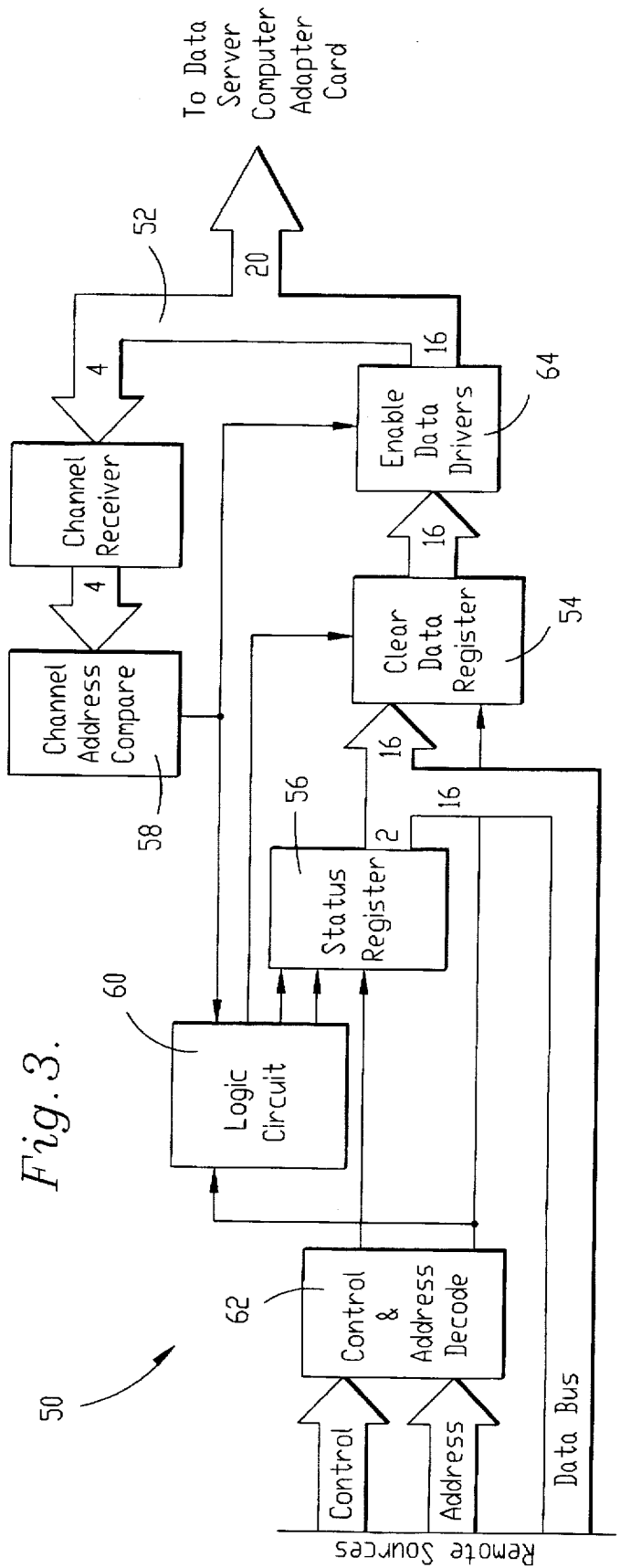
FIG. 3 is a block diagram of a remote sources adaptor board which couples with remote computer sources.

Interface control software, which in the preferred embodiment is executed on the data server computer 12, retrieves and stores preselected information from a variety of sources. As described in more detail below, the interface control software may retrieve preselected information from the files of data server computer 12 or from a plurality of remote source computers. Server adaptor card 20 is configured for periodically transmitting this preselected information from the data server computer 12 simultaneously to all personal computers 14 by way of structure 18. As illustrated in FIG. 2, server adaptor card 20 includes clock generator 30, transmission cycle length control circuit 32, a channel address generator 34, shift register 36, data register 38, status register 40, handshaking and timing logic circuit 42, remote source cable interface 44, and bus control and address decoding circuit 46.

Server adaptor card 20 transmits clock and synchronous serial data signals over second communication path 24 to each personal computer 14. Transmission cycle length is set by comparing a count of clock generator 30 to 16 bit channel counter 34. When the values match, counters 34 are reset and the clock signal is gated which causes a small pause. Counters 34 provide the current channel address for selecting the source of data loaded into shift register 36. Shift register 36 is loaded and shifted by clock generator 30.

Information for transmission is read from data register 38. Data register 38 is a 16 bit write-only register where data server computer 12 writes data to be transmitted. Status register 40 has a "reset flag" and a "data taken" flag which are read by data server computer 12. The reset flag indicates that clock generator 30 has paused. The reset flag is used to reset data pointers. The data taken flag indicates that shift register 36 has read the last data written to data register 38. The data taken flag is used to indicate that new data may be written to data register 38.

Handshaking and timing logic circuit 42 sets the data taken status flag after data register 38 has been loaded into shift register 36. Circuit 40 also clears the data taken status flag when data server computer 12 writes data to data register 38 and clears data register 38 after the data has been loaded into shift register 36. Additionally, circuit 42 sets the reset flag when clock generator 30 is being paused. Bus control and address decoding circuit 46 provides the individual read and write signals for data register 38 and shift register 36.

The interface control software may also retrieve preselected information from a variety of remote sources such as other computers. Remote source cable interface 44 is provided for retrieving information from remote sources. In preferred forms, communication with the remote sources is over a twisted pair of ribbon cable using RS-485 line receivers and drivers. To retrieve information from remote sources, server adaptor card 20 sends a 4-bit channel address to all remote sources connected to remote source cable interface 44. As described in the next paragraph, the remote sources respond to their address by returning information to server adaptor card 20 through the same remote source interface 44.

Remote source adaptor card 50 is installed in an expansion slot of each remote source computer. Remote source adaptor card 50 allows the remote sources to send information to the parallel input port of server adaptor card 20. Each remote source adaptor card 50 includes cable 52, data registers 54, status registers 56, channel address comparator 58, handshaking and timing logic circuit 60, and PC bus control and address decoding circuit 62.

Remote source cable interface 52 is the same interface described above and is provided for transmitting information from the remote source computer to the data server adaptor card 20. Data register 54 is a 16 bit write-only register where the remote source computer writes data to be sent to data server adaptor card 20. Status register 56 has a "reset flag" and a "data taken flag" which are read by the remote source computer. The reset flag indicates that clock generator 30 of data server adaptor card 20 has paused. The reset flag is used to reset data pointers. The data taken flag indicates that shift register 36 of data server adaptor card 20 has read the last data written to data register 54. Accordingly, the data taken flag indicates that new data may be written to data register 34.

To initiate a request for data from remote source computers, data server adaptor card 20 transmits a 4-bit channel address signal to all remote sources computers attached to remote source cable interface 44. When this channel address matches the channel setting on any one remote source adaptor card 50, data drivers 64 are enabled and the data in data registers 54 is transmitted to data server adaptor card 20.

Handshaking and timing logic circuit 60 sets the data taken flag after the data in data register 54 has been transmitted. Circuit 60 also clears the data taken flag when the remote source computer writes data to data register 54. Additionally, circuit 60 clears data register 54 after the data has been transmitted and sets the reset flag when the channel match signal has been unchanged for a predetermined amount of time.

As illustrated in FIGS. 1 and 4, personal computer adaptor card 22 is installed in an expansion slot of each personal computer 14 coupled with the data server computer. Personal computer adaptor cards 22 are configured for receiving the information which is periodically transmitted from data server computer 12. Each personal computer adaptor card 22 includes an address and a channel identification circuit 70, shift registers 72, timing logic circuits 74, and PC bus control and address decoding circuits 76 (see FIG. 4).

Each personal computer adaptor card 22 receives the clock and synchronous serial data signals transmitted from the data server adaptor card 20. Counters in broadcast address and channel identification circuit 70 count the clock signals. These counters are reset when a pause is detected in clock generator 30 of data server adaptor card 20.

As described above, data is preferably transmitted over 16 channels from data server computer 12. The starting address and desired channel which is to be read by personal computer adaptor card 22 is written into shift register 72. The starting address is compared to the counters in broadcast and channel identification circuit 70. When the addresses match, a channel comparison is enabled. Each time there is a channel match, data transmitted to shift registers 72 is latched and a Direct Memory Access (DMA) transfer is requested. This continues until the DMA controller signals an end of transfer or a new reading is requested.

PC bus control and address decoding circuit 76 provides the individual read and write signals for shift registers 72.

Second communication path 24 couples server adaptor card 20 with each personal computer adaptor cards 22. Second communication path 24 can be any conventional cabling such as twisted pair cables, coaxial cable, baseband cable, broadband cable, or fiberoptic cable. Additionally, second communication path 24 can be a wireless path. For example, personal computers 14 can be equipped with small wireless transmitting circuit boards and data server computer 12 can be equipped with a corresponding wireless receiving circuit board to link personal computers 14 to data server computer 12 in a wireless fashion. In preferred forms, second communication path 24 is provided by two spare pairs of twisted copper cables in existing category five wiring installations.

In operation, first communication path 16 couples data server computer 12 with personal computers 14 to form a conventional networked distributed processing system. Coupling structure 18 provides a second information communication path 24 which is independent of the conventional local area network communication path 16.

The interface control software, which in the preferred embodiment is executed on the data server computer 12, retrieves and stores preselected information from a variety of sources including the files of data server computer 12 and a plurality of remote source computers. The preselected information can be computer programs and other information which is frequently read by personal computers 14. Data server adaptor card 20 repeatedly transmits this preselected information from data server computer 12 simultaneously to all of the personal computer adaptor cards located in each of the personal computers 14. The present invention does not require personal computers 14 to initiate data requests over conventional local area network communication path 16. Rather, certain preselected information is continually or periodically transmitted by data server adaptor card 20 to all of the personal computer adaptor cards 22 located in each personal computer 14.

Second communication path 24 is dedicated for the single direction, that is, one-way, transmission of information from data server computer 12 to personal computers 14. Accordingly, second communication path 24 is never congested with data requests from personal computers 14. Moreover, the information transmitted by data server adaptor card 20 can be simultaneously loaded into all of the personal computers 14.

The information transmitted from data server adaptor card 20 can be dynamically managed so that additional information not normally transmitted can be requested by users operating personal computers 14. A user desiring additional information can initiate a data request over the conventional Ethernet or Token Ring local area network path 16. The interface control software retrieves this data request and loads the data into data server adaptor card 20 shift register 36. Accordingly, the requested information is transmitted along with the preselected information. Since many files stored at a data server computer are secured files, the interface control program first verifies the security of the person requesting the file.

To increase the throughput of information over second communication path 24, the coupling structure may interleave multiple files of data into a multi-channel transmission signal. This allows the information to be transmitted at a speed considerably faster than the rate at which the individual personal computers can retrieve the information from the communication path. For example, a 16 channel transmission signal may be used to transmit information from shift registers 36 at a transmission rate which is 16 times faster than the retrieval rate of personal computers 14. This allows sixteen separate files to be interleaved into the 16 channel transmission signal. Personal computers 14 monitor the transmission signal and retrieve only the desired information from one of the 16 channels as it passes by.

Although the invention has been described with reference to the preferred embodiment illustrated in the attached drawing figures, it is noted that equivalents may be employed and substitutions made herein without departing from the scope of the invention as recited in the claims. For example, although the data server adaptor card and personal computer adaptor cards are illustrated and described as being stand alone circuit boards, they can be combined with existing Ethernet or Token Ring adaptor circuit boards to provide combination adaptor boards. Also, whereas the interface control software is described to be executed on the data server computer 12, it could also be executed on a separate microprocessor which could be integrated into the data server adapter card 20. In this instance, a block of memory on the data server adapter card 20 could serve as a buffer for storing programs waiting to be transmitted over second communication path 24.

Additionally, although the coupling structure of the present invention is preferably used in conjunction with a conventional local area network system, it can operate independently to provide a single direction distributed data processing system. Use of such an independent system can be envisioned for applications requiring access to programs and data by a large number of users such as educational systems containing large data bases of technical information. It is envisioned that in such a system, programs, databases, and even video information could be distributed over cable, fiber optics, or even satellite utilizing the technology of the present invention.

Applications which usually require read only access to data could utilize the benefits of the present invention by accessing a dial up link as the convention network means when necessary, while actually loading files over the second communication path which in this case could be a fiber optic cable, a radio, TV subcarrier, or even a satellite channel.

Additionally, although the data server computer and the personal computers are described and illustrated as conventional IBM compatible microcomputers, other devices may be substituted without departing from the scope of the claims.

Having thus described the preferred embodiment of the invention, what is claimed as new and desired to be protected by Letters Patent includes the following:

1. A data transmission apparatus comprising:

a data server computer including means for storing and transmitting information;

a plurality of user computers operating independently of said data server computer with each including means for receiving and storing information transmitted from said data server computer; and means for coupling said data server computer and said user computers for transmitting the same preselected information a plurality of times from said data server computer simultaneously to said user computers without requiring data requests from said user computers, each of said user computers including means for identifying selected portions of said information and for retrieving and storing said selected portions of said information.

2. The data transmission apparatus as set forth in claim 1, said coupling means including means for transmitting multiple channel transmission signals from said data server computer to said user computers so that different information is relegated to separate channels of said multiple channel signals.

3. Data transmission apparatus as set forth in claim 2, each of said user computers including means for identifying which of said multiple channels contains desired information as an identified channel and means for storing the desired information from said identified channel only.

4. The data transmission apparatus as set forth in claim 3 including means for networking said user computers to said data server independent of said coupling means, said user computers including means for generating data base calls transmitted over said networking means for requesting information from said data server computer.

5. The data transmission apparatus as set forth in claim 4, said coupling means including means for receiving said data base calls and for transmitting said requested information from said data server computer simultaneously to all of said user computers.

6. The data transmission apparatus set forth in claim 5, each of said user computers including means for transmitting a password with said database calls.

7. The data transmission apparatus set forth in claim 6, said data server computer including means for comparing said passwords to known passwords to authorize the transmission of said requested data over said networking means.

8. The data transmission apparatus set forth in claim 7, said coupling means including encrypting means for encrypting said requested information with a code associated with said password so that only the user computer initiating the database call can retrieve the requested information from the coupling means.

9. The data transmission apparatus set forth in claim 1, said information including computer programs.

10. The data transmission apparatus set forth in claim 1, said information including digital data.

11. A data transmission apparatus comprising:

a data server computer including means for storing and transmitting information;

a plurality of user computers operating independently of said data server computer, said user computers including means for storing information transmitted from said data server computer and means for generating database calls to request information from said data server computer;

means for networking said user computers to said data server computer for communicating said database calls from said user computers to said data server computer; and means for coupling said data server computer and said user computers for transmitting the same preselected information a plurality of times from said data server computer simultaneously to all of said user computers without requiring data requests from said user computers, said coupling means being independent of said networking means, said coupling means including means for receiving said data base calls and transmitting said requested information from said data server computer simultaneously to all of said user computers, each of said user computers including means for identifying selected portions of said information and for retrieving and storing said selected portions of said information.

12. The data transmission apparatus set forth in claim 11, each of said user computers including means for transmitting a password with said database calls.

13. The data transmission apparatus set forth in claim 12, said data server computer including means for comparing said passwords to known passwords to authorize the transmission of said requested information over said networking means.

14. The data transmission apparatus set forth in claim 13, said coupling means including encrypting means for encrypting said requested information with a code associated with said password so that only the user computer initiating the database call can retrieve the requested information from the coupling means.

15. A method of providing a networked data system comprising the steps of:

providing a data server computer including means for storing and transmitting information;

providing a plurality of user computers operating independently of said data server computer, said user computers each including means for receiving and storing information transmitted from said data server computer;

coupling said data server computer with said user computers;

transmitting the same preselected information a plurality of times from said data server computer simultaneously to all of said user computers without requiring data requests from said user computers; and in each of said user computers, identifying selected portions of said information and retrieving and storing said selected portions of information.

16. The method as set forth in claim 15, said transmitting step further including the step of transmitting said information to said user computers in multiple channel transmission signals wherein different data is relegated to separate channels of said multiple channel signals.

17. The method as set forth in claim 16, said user computers including means for identifying which of said multiple channels contains desired information and means for storing the desired information from the identified channel only.

18. The method as set forth in claim 17, said user computers including means for generating database calls to request information from said data server computer.

19. The method as set forth in claim 18, including the step of networking said user computers to said data server computer for communicating said database calls from said user computers to said data server computer.

20. The method as set forth in claim 19, including the step of receiving said database calls and transmitting said requested information from said data server computer simultaneously to all of said user computers.

21. The method as set forth in claim 20, said user computers including means for transmitting a password with said database calls.

22. The method as set forth in claim 21, said data server computer including means for comparing said passwords to known passwords to authorize the transmission of said requested information over said networking means.

23. The method as set forth in claim 22, including the step of encrypting said requested information with a code associated with said password so that only the user computer initiating the database call can retrieve the requested data.

24. A data transmission apparatus comprising:

a data server computer including means for storing and transmitting information;

a plurality of user computers operating independently of said data server computer, said user computers including means for storing information transmitted from said data server computer and means for generating database calls to request information from said data server computer;

a first communication path coupling said data server computer with said user computers, said first communication path configured for networking said user computers to said data server computer for communicating said database calls from said user computers to said data server computer; and a second communication path for coupling said data server computer and said user computers for transmitting preselected information a plurality of times from said data server computer simultaneously to all of said user computers without requiring data requests from said user computers, said second communication path being independent of said first communication path, said second communication path including means for receiving said data base calls and transmitting said requested information from said data server computer simultaneously to all of said user computers.

25. The data transmission apparatus set forth in claim 24, each of said user computers including means for transmitting a password with said database calls.

26. The data transmission apparatus set forth in claim 25, said data server computer including means for comparing said passwords to known passwords to authorize the transmission of said requested information over said networking means.

27. The data transmission apparatus set forth in claim 26, including encrypting means for encrypting said requested information with a code associated with said password so that only the user computer initiating the database call can retrieve the requested information from the second communication path.

\* \* \* \* \*